UNITED STATES PATENT OFFICE.

GADIENT ENGI, OF BASEL, SWITZERLAND, ASSIGNOR TO THE FIRM OF SOCIETY OF CHEMICAL INDUSTRY IN BASLE, OF BASEL, SWITZERLAND.

RED-VIOLET TO BLUE VAT-DYES AND PROCESS OF MAKING SAME.

No. 848,356.    Specification of Letters Patent.    Patented March 26, 1907.

Application filed January 9, 1907. Serial No. 351,444.

*To all whom it may concern:*

Be it known that I, GADIENT ENGI, chemist and doctor of philosophy, a citizen of the Swiss Republic, and a resident of Basel, Switzerland, have invented new and useful Red-Violet to Blue Vat-Dyeing Dyestuffs and a Process for the Manufacture of the Same, of which the following is a full, clear, and exact description.

In my United States Letters Patent No. 836,309, dated November 20, 1906, I have described the manufacture of red-violet to violet-blue vat-dyeing dyestuffs by condensing alpha-oxythionaphthene (thioindoxyl) with alpha-isatinarylids of the general formula

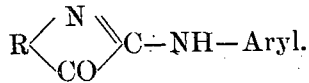

Since I have found that these dyestuffs can be transformed into new more valuable products by introducing a halogen into its molecule. The thus-resulting halogen derivatives possess relatively to the dyestuff employed as parent materials the advantage of a greater fastness to light and of more lively tints.

The invention is illustrated by the following example: Four parts, by weight, of the product resulting from the condensation of one molecule alpha-oxythionaphthene (thioindoxyl) with one molecule alpha-isatinanilid in presence of nitrobenzene are suspended into forty parts of nitrobenzene. To this suspension are added six to eight parts of bromin, and the mixture is heated in the course of about half an hour in a reflux apparatus gradually to a gentle ebullition. The mass is further heated for about one and one-half hours. The beautiful blue-violet solution is then allowed to cool, and the product of reaction is separated by filtration, washed with alcohol, and dried. The new dyestuff constitutes brilliant violet small crystals soluble in concentrated sulfuric acid with a blue coloration. By diluting this sulfuric solution with water violet-blue flocks are precipitated. Fuming sulfuric acid dissolves the dyestuff with formation of a solution showing a bright-blue coloration, which is not changed on heating. In hot alcohol it is only sparingly soluble, but sufficiently in hot benzene and easily in hot nitrobenzene with a blue-violet coloration. When made into a vat with the usual reducing agents—as, for instance, caustic-soda lye and sodium hydrosulfite—the dyestuff yields a bright-yellow vat, from which unmordanted cotton is dyed lively-blue tints, which can be transformed by a short soaping into lively-violet tints exceedingly fast to washing, light, and chlorin.

In analogous manner can be prepared the halogen derivative of the other dyestuffs described in the specified Letters Patent No. 836,309 and resulting from the condensation of salicylthioacetic acid or alpha-oxythionaphthene (thioindoxyl) with alpha-isatinarylids. For instance, the product resulting from the condensation of two molecules alpha-oxythionaphthene with one molecule alpha-isatinanilid yield a bromin derivative dyeing unmordanted cotton from an alkaline vat bright blue-violet tints, while the bromin derivative of the product resulting from the condensation of one molecule alpha-oxythionaphthene with one molecule alpha-isatinanilid in acetic anhydrid dyes unmordanted cotton violet tints.

What I claim is—

1. The herein-described process for the manufacture of red-violet to blue vat-dyeing dyestuffs, by treating with a halogen in presence of an indifferent diluent the products obtained by the condensation of alpha-oxythionaphthene (thioindoxyl) with alpha-isatinarylids of the general formula

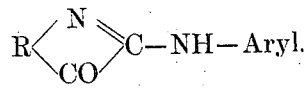

2. As new products, the halogenated red-violet to blue vat-dyeing dyestuffs derived from the condensation products of alpha-oxythionaphthene (thioindoxyl) with alpha-isatinarylids, the said dyestuffs being sparingly soluble in alcohol, sufficiently soluble in hot benzene and easily soluble in nitrobenzene with a blue-violet coloration, giving with sulfuric acid blue solutions from which a precipitate is separated by addition of water and dissolving in fuming sulfuric acid with a bright-blue coloration which is not changed on heating.

In witness whereof I have hereunto signed my name, this 19th day of December, 1906, in the presence of two subscribing witnesses.

GADIENT ENGI.

Witnesses:
GEO. GIFFORD,
AMAND RITTER.